Aug. 3, 1954
C. B. HOLM
2,685,302
DIAPHRAGM VALVE
Filed April 5, 1949
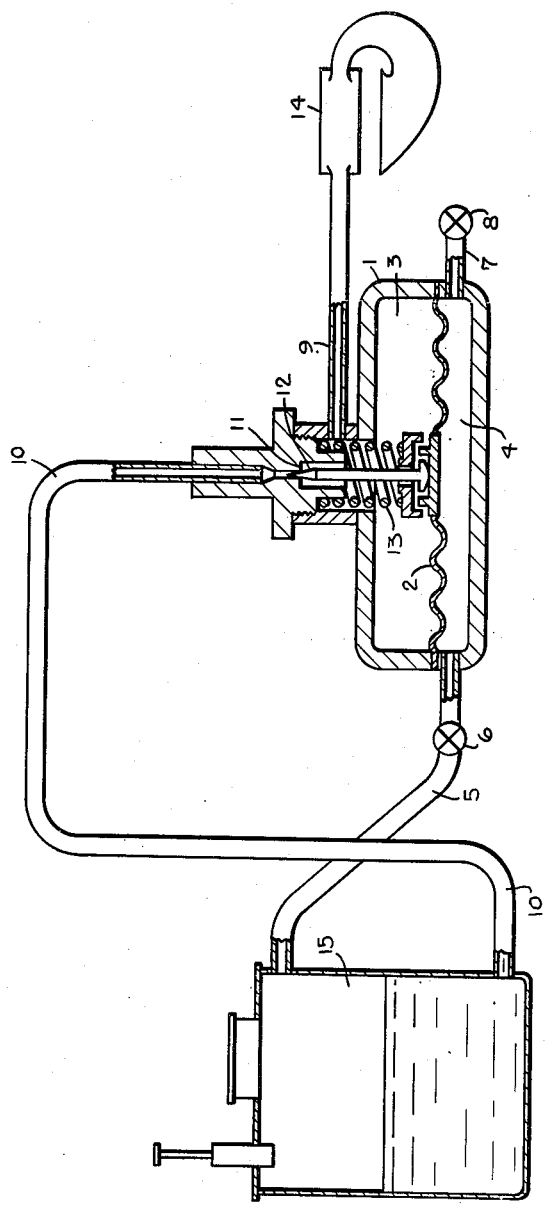
INVENTOR.
CARL BERNHARD HOLM
BY
ATTORNEY Patented Aug. 3, 1954

2,685,302

UNITED STATES PATENT OFFICE 2,685,302

DIAPHRAGM VALVE

Carl Bernhard Holm, Roslags-Nasby, Sweden

Application April 5, 1949, Serial No. 85,603

Claims priority, application Sweden April 10, 1948

1 Claim. (Cl. 137—395)

The present invention concerns a device for manually opening a diaphragm valve of the kind, which automatically opens and closes in response to the pressure on either side of a diaphragm and which is intended for use in containers filled with liquid held under air pressure.

The invention is illustrated in the accompanying drawing which shows a diagrammatic view of a diaphragm valve forming the subject matter of the invention.

In the drawing, numeral 1 designates a valve housing divided into two chambers 3, 4 by a diaphragm 2. The lower chamber 4 of the valve housing has an inlet pipe 5 with a closing valve 6 and an outlet pipe 7 with a closing valve 8. The upper chamber 3 of the valve housing has an outlet pipe 9 and an inlet pipe 10, in which is arranged a valve seat 11 for a valve pin 12 that is connected with the diaphragm 2. A pressure spring 13 is provided between the diaphragm 2 and the valve seat.

The valve is adapted to communicate with the container for the pressurized liquid through the pipe 10 and to communicate through the pipe 9 with the place to which said liquid is to flow.

Through the pipe 5 the chamber 4 communicates with that portion 15 of the container which is filled with gas.

Said pipe is provided with a closing valve 6.

The valve functions in such a manner, that it opens when the pressure in the upper chamber 3 together with the spring 13 over-balances the pressure in the other chamber 4. If the valve is to be opened manually, the closing valve 8 is opened simultaneously with the closing of the closing valve 6, the pressure in the lower chamber 4 decreasing, so that the valve opens by the influence of the spring 13 together with a possible pressure in the upper chamber 3.

Of course the device where the valve 6 is replaced by a throttle point on the pipe conduit 5 may be used only if the gas in 4 may be allowed to flow out through 7 as is the case when for instance air is concerned.

If a pressure controlled diaphragm valve shall open or close at a certain, exactly fixed pressure, it is necessary that the diaphragm is in zero position at the moment of opening, and closing respectively, since there can be counted upon no constant resilience or tension in the diaphragm. As it has been difficult to produce a valve with the accuracy needed heretofore, there should be provided adjusting means permitting an adjustment of the space between the valve pin and the valve seat.

Having now described my invention, what I claim as new and desire to secure by Letters Patent is:

An installation for the supply of a fluid to a place of use comprising in combination a vessel, said fluid held therein under air pressure, a valve device including a valve housing, a flexible undulated diaphragm in said housing dividing the latter into an upper and a lower chamber, a valve stem supported upon said diaphragm and extending upwardly therefrom in said upper chamber a valve in the upper end of said stem, a pressure spring provided between the diaphragm and a valve seat, a tube connecting the lower portion of said vessel with the upper portion of said upper chamber, said valve seat being in the chamber entering end portion of said tube cooperating with said valve, a tube connecting said lower chamber with the upper portion of said vessel, a valve in said last mentioned tube, a pipe connecting said upper chamber to said place of use, a tube connected to said lower valve chamber and a manually operable valve in said tube.

References Cited in the file of this patent

UNITED STATES PATENTS

| Number | Name | Date |
|---|---|---|
| 47,184 | Bishop | Apr. 11, 1865 |
| 595,061 | Gulland | Dec. 7, 1897 |
| 859,341 | Scheier | July 9, 1907 |
| 974,222 | Williams | Nov. 1, 1910 |
| 1,048,228 | Sutherland | Dec. 24, 1912 |
| 1,314,977 | Neal | Sept. 2, 1919 |
| 1,496,935 | Lemmon | June 10, 1924 |
| 1,849,475 | Bottoms | Mar. 15, 1932 |
| 2,233,395 | Blanchard | Mar. 4, 1941 |